(12) United States Patent
Lee

(10) Patent No.: US 7,810,709 B2
(45) Date of Patent: Oct. 12, 2010

(54) COPY PREVENTING DEVICE AND PREVENTING METHOD THEREOF

(76) Inventor: Hyo-Seung Lee, 169, Whigyung-1dong, Dongdaemoon-gu, Seoul (KR) 130-875

( * ) Notice: Subject to any disclaimer, the term of this patent is extended or adjusted under 35 U.S.C. 154(b) by 1022 days.

(21) Appl. No.: 10/587,659

(22) PCT Filed: Feb. 1, 2005

(86) PCT No.: PCT/KR2005/000289

§ 371 (c)(1), (2), (4) Date: Jul. 28, 2006

(87) PCT Pub. No.: WO2005/078630

PCT Pub. Date: Aug. 25, 2005

(65) Prior Publication Data

US 2007/0139687 A1    Jun. 21, 2007

(30) Foreign Application Priority Data

Feb. 18, 2004 (KR) .............. 10-2004-0010549
Feb. 19, 2004 (KR) .............. 10-2004-0010912
Apr. 2, 2004 (KR) .............. 20-2004-0009258

(51) Int. Cl.
*G06F 17/00* (2006.01)
(52) U.S. Cl. .................. 235/375; 235/380; 235/382
(58) Field of Classification Search .............. 235/375, 235/380, 382
See application file for complete search history.

(56) References Cited

FOREIGN PATENT DOCUMENTS

| EP | 256768 A2 | 2/1988 |
| JP | 9-501529 A | 2/1997 |
| KR | 2003-28789 A | 4/2003 |
| KR | 2003-96131 A | 12/2003 |

*Primary Examiner*—Karl D. Frech
(74) *Attorney, Agent, or Firm*—Edwards Angell Palmer & Dodge LLP; Kongsik Kim

(57) ABSTRACT

The present invention relates to a copy preventing device and a copy preventing method thereof which is capable of preventing copy illegally of products using a semiconductor stored a password therein. The copy of the product can be prevented by ALPU (Algorithm License Permittion Uniwide) or random value. The present invention also relates to a device and method thereof which is capable of being changed an operation, structure and information of the semiconductor by constructing the ALPU and RF Reader therein.

5 Claims, 3 Drawing Sheets

COPY PREVENTING DEVICE AND PREVENTING METHOD THEREOF

TECHNICAL FIELD

The present invention relates to a copy preventing device and preventing method thereof by an Algorithm License Permit Unit (ALPU) or random exchanging method.

The present invention also relates to a copy preventing device and preventing method thereof which is capable of preventing copy by recording a serial number of a product because a coding operation can be edited and a serial number can be applied thereto under a condition that inner structure of a semiconductor is not changed by coding operation of the ALPU.

The present invention also relates to a copy preventing device and preventing method thereof which is capable of changing an operation, structure and inner information of a semiconductor by a wireless signal from ALPU and RF reader.

BACKGROUND ART

In general, when a developer is different from a manufacturer the developer should inform the manufacturer for example, of a product operating method, manufacturing method, program stored, the size of PCB, elements operating method and so on for manufacturing the product.

In this case, if the manufacturer does not pay the royalty promised to the developer or illegally manufactures products which exceed a number of same promised to the developer, the developer can not take an appropriate action against the manufacturer except for a lawsuit. If the manufacturers are a small business or a foreigner the domestic law can not be surely applied to them. Furthermore, if the third parties manufacture the same product due to the revealing of information, the appropriate action can not be taken against them. Although the lawsuit can be prosecuted against the cost thereof is very high in this case.

In order to overcome the problems as above the conventional developer often directly supplies a computer having a stored program developed for operating the product to the manufacturer. However, in this case it increases the price of the computer and the managing cost and it is difficult to supply the computer to the manufacturer at a suitable time.

Furthermore, because the conventional ALPU device only uses an eternal storing device as a memory, it is necessary to change the mask or to change the design of the semiconductor when it is necessary to produce small quantities and several kinds of products.

SUMMARY OF THE INVENTION

The present invention has been invented to overcome the above problems it is an object of the first embodiment to provide a copy preventing device and a copy preventing method that an electric product is determined whether a chip set for preventing copy stores a proper coding signal therein or not using ALPU or random value exchanging thereby to control the operation of the electric product.

It is an object of the second embodiment to provide a coding operating device and method that because the most upper code determining unit and the exchangeable memory are constructed, the ROM table can be exchanged at the time of inputting the most upper code thereby to be exchanged the coding method using the software and because the serial number of the semiconductor can be applied small quantities and several kinds of the products can be controlled by the serial number.

It is an object of the third embodiment to provide a coding operating device and method that RF Reader and ALPU are constructed for exchanging the code thereby causing the burglary to be prevented.

In order to achieve the above objects, the first embodiment of the present invention provides a copy preventing device comprising: CPU; an interface for inputting a random value from an outer device as an electric product stored a predetermined random value data, for determining whether it is copied or not; a ROM table for storing the random value from the interface and storing the constant value for coding; an operating unit for operating the random value data from the interface and the constant value from the ROM table; a register for storing the operated data from the operating unit; and an outer device for outputting the operated data from the register and for determining whether the product can be operated or not according to the compliance to the coding signal stored in the outer device.

The CPU stores several algorithms so that other algorithms can be applied when the present algorithm is revealed.

The CPU has a ROM table stored an inner constant value for coding so that a coding operation can be exchanged without exchanging an entire mask.

In order to achieve the above objects, the second embodiment of the present invention provides a coding operating device comprising: an interface for inputting/outputting the data signal from/to an outer device; a code determining unit for determining the code according to an outer pin option when the most upper code is inputted from the interface; a ROM table for selecting the most upper code according to the outer pin option; a flash memory or EPROM for exchanging the ROM value according to the determining result of the most upper code determining unit; an operating unit for inputting the data from the EPROM and the data from the ROM table and the random data from the interface for the coding operation; and a register for outputting the operated value to the interface for outputting the operated value to the outer device.

A coding operating method of ALPU according to the second embodiment of the present invention uses One Time Program or Multiple Time Program for the code exchanging system when the exchanging method is established for exchanging a code and a serial number.

A coding operating method of ALPU according to the second embodiment of the present invention comprises the step that when the outer pin is established at the high level or at the low level the most upper code can be exchanged so that an appropriate action can be applied when the most upper code is revealed.

In order to achieve the above objects, the third embodiment of the present invention provides a coding operating device comprising: ALPU RF IC for outputting the radio signal; RFID Reader for reading the radio signal from the ALPU RF IC; and RFID server for determining whether an originally established coding signal is present or not according to the radio signal read by the RFID Reader.

The ALPU RF IC comprises RFIC for inputting/outputting from/to the RF Reader; and ALPU for encoding and decoding the radio signal from the RFID Reader.

The ALPU comprises ECC (Error Correction Code) for encoding and decoding for correcting the error data during the input/output between the RFID Reader and RFID and RF IC and ALPU or partial defection of the inner side of the semiconductor.

The coding operating method according to the third method of the present invention comprising the step that the radio signal from the RF IC is inputted to the ALPU and to the encoder through ECC for encoding and the output signal from the ALPU decodes by the decoder and outputs to the RF IC through ECC so that RFID Reader can read the outputted value from the RF IC.

DISCLOSURE OF INVENTION

A detailed description of the invention will now be described with reference to the accompanying drawings.

Figure 1:
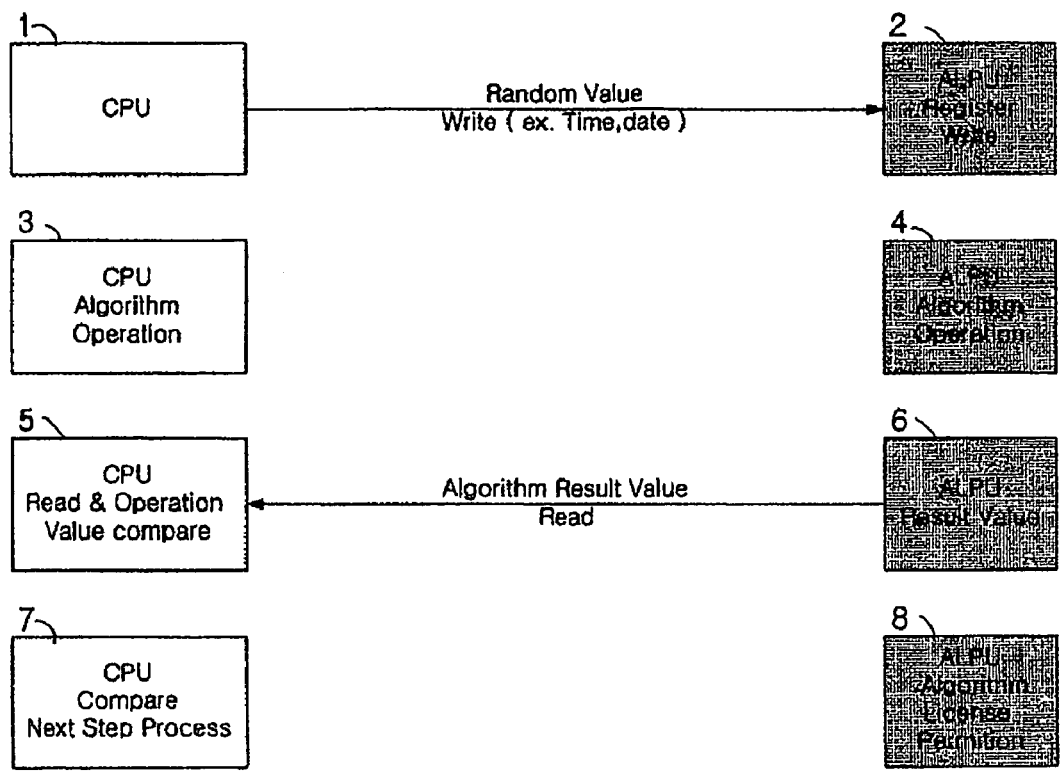
FIG. 1 is an operation flow of a copy preventing device using ALPU and a random value exchanging according to a first embodiment of the present invention.
Figure 2:
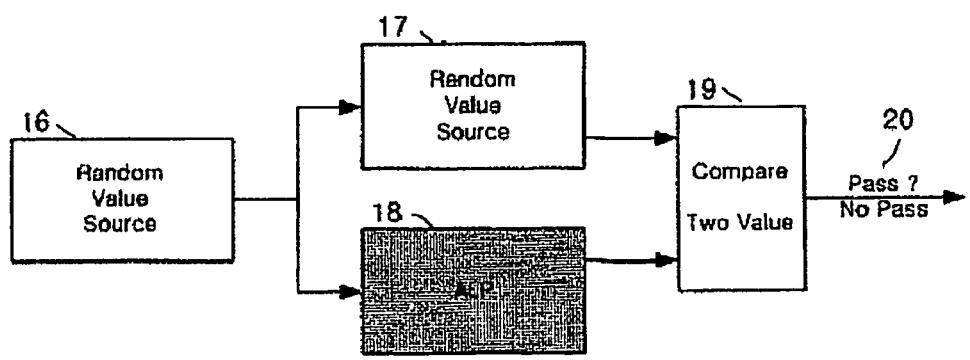
FIG. 2 is a block diagram of a copy preventing device using ALPU and a random value exchanging according to a first embodiment of the present invention.
Figure 3:
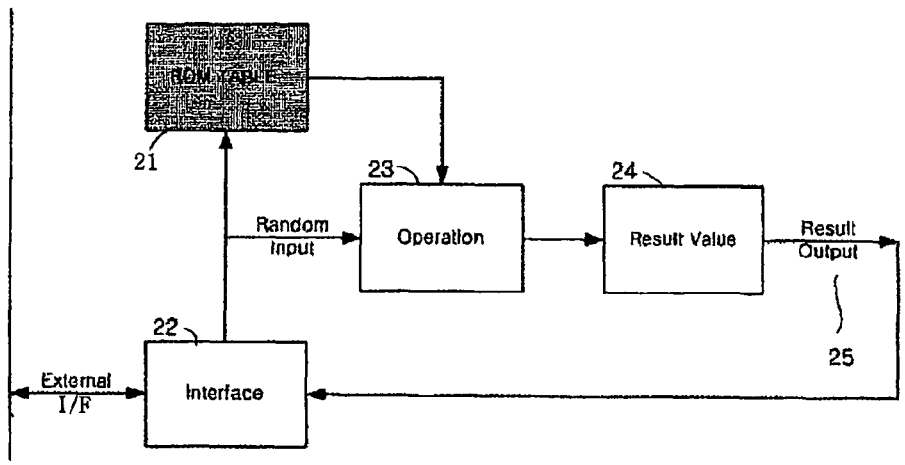
FIG. 3 is a block diagram of a chip set of a copy preventing device using ALPU and a random value exchanging according to a first embodiment of the present invention.

FIG. 1 is an operation flow of a copy preventing device using ALPU and a random value exchanging according to a first embodiment of the present invention, FIG. 2 is a block diagram of a copy preventing device using ALPU and a random value exchanging according to a first embodiment of the present invention, FIG. 3 is a block diagram of a chip set of a copy preventing device using ALPU and a random value exchanging according to a first embodiment of the present invention.

As shown in FIGS. 1 to 3 a copy preventing device of the present invention according to the first embodiment comprises a CPU 1, an interface 22 for inputting a random value from an outer device 27 as an electric product stored a predetermined random value data, for determining whether it is copied or not, a ROM table 21 for storing the random value from the interface 22 and storing the constant value for coding, an operating unit 23 for operating the random value data from the interface 22 and the constant value from the ROM table 21, a register 24 for storing the operated data from the operating unit 23, an outputting device 25 for outputting the operated data from the register 24 and for determining whether the product can be operated or not according to the compliance to the coding signal stored in the outer device 27.

The device having the above constructions operates that an interface 22 is inputted a random value data for determining whether it is copied or not from an outer device 27 as an electric product stored a predetermined random value data. The ROM table stores the random value data from the interface 22. The operating device 23 operates the random value data from the interface 22 and the constant value from the ROM table 21. The register 24 stores the result data from the operation device 23 and the outputting device 25 outputs the result data from the register 24 to the output device 27 for determining whether the product can be operated or not according to the compliance to the coding signal stored in the outer device 27.

The copy preventing device of the present invention can be applied with other chip sets for exchanging the random value by changing the ROM table 21 or a mask data related to the operating logic of the operating unit 23. Therefore, it can be produced the products that coding operation is different if a different coded chip set is needed at a low cost.

As shown in FIG. 1 the outer device 27 as the electric products operates to interface the chip set coded for preventing copy and the random value data.

For example, when the set top is inputted for booting the set top operates to digitalized the present time for inputting the digitalized value to the ALPU.

The chip set for exchanging the random value stores the operated value according to the predetermined algorithm using the inner constant by being inputted the data. The algorithm uses the coding method that it is difficult to find a correlation between input and output, for example, the four rules of arithmetic; addition, subtraction, multiplication and division, XOR, AND, NAND, NOR, and the outer device 27 operates according to the algorithm of the chip for exchanging the random value.

The outer device 27 processes the digitalized time value and the predetermined constant value (3). Furthermore, the outer device 27 reads the random exchanging data for comparing the operated result value (5)(6). If the result value is same to the random exchanging value, the next operation is proceeded. Otherwise the operation is stopped.

Therefore, the chip set for exchanging the random value is needed for booting the set top box. If the chip set does not exist it is impossible to operate, and accordingly, the manufacturing company can produce the chip set only for the quantity provided from the developer.

FIG. 2 is a block diagram of a copy preventing device using ALPU and a random value exchanging according to a first embodiment of the present invention.

The digitalized time value 16 as the random value data compares the operated value 18 from the chip set and the operated value 17 from the outer device 27 by the comparing device 19 (19). As the result of that the values are the same it is determined that the license is OK. Otherwise the operation continuous for several more times or the operation is stopped.

Figure 4:
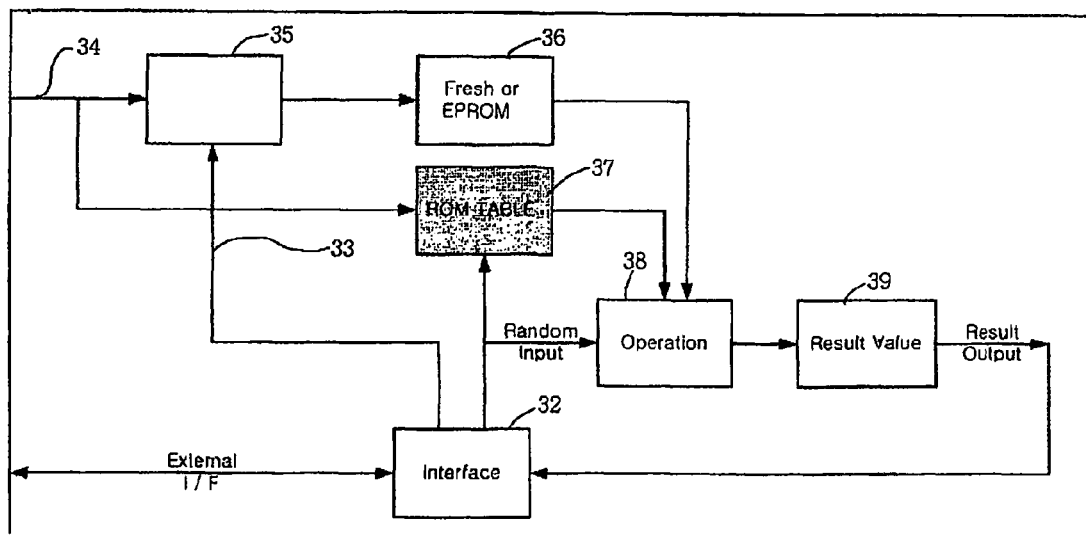
FIG. 4 is a block diagram of a code device of a ALPU according to a second embodiment of the present invention.

FIG. 4 is a block diagram of a coding device of a ALPU according to a second embodiment of the present invention.

As shown in FIG. 4 the coding device of the ALPU according to a second embodiment of the present invention comprises an interface 32 for inputting/outputting the data signal from/to an outer device 31, a code determining unit 35 for determining the code according to an outer pin option 34 when the most upper code is inputted from the interface 32, a ROM table 37 for selecting the most upper code according to the outer pin option 34, a flash memory or EPROM 36 for exchanging the ROM value according to the determining result of the most upper code determining unit 35, an operating unit 38 for inputting the data from the EPROM 36 and the data from the ROM table 37 and the random data from the interface 32 for the coding operating, and a register 39 for outputting the operated value to the interface 32 for outputting the operated value to the outer device 31.

The device having the above constructions operates that the most upper code determining unit 35 selectively determines from the most upper code from the interface 32 inputted the data signal from the outer device 31 according to the outer pin option 34.

The code selectively determined from the most upper code determining unit 35 outputs to the EPROM 36 to be stored thereafter to be outputted to the operating unit 38.

Therefore, the operating unit 38 selects the most upper code according to the outer pin option 34 and operates the coding according to the value from the ROM table 37 and the value from the interface 32.

The operated value from the operating unit 38 is outputted to the outer device 31 through the interface 32.

As the foregoing descriptions because the most upper code determining unit and the exchangeable memory are constructed, the ROM table can be exchanged at the time of inputting the most upper code thereby to be exchanged the coding method using the software.

Furthermore, because the serial number of the semiconductor can be applied the small quantity and several kinds of the goods can be controlled by the serial number of the products.

For example, the EPROM 36 can store the personnel registration number, recording for health, address thereby to be personnel card. The EPROM 36 can use One Time Program or Multiple Time Program for the code exchanging system when the exchanging method is established. Furthermore, when the outer pin is established the high level or the low level the most upper code can be exchanged so that an appropriate action can be applied when the most upper code is revealed.

That is, when the semiconductor is same the pin that fixed to the high level or to the low level can be exchanged. When the exchanged value applies to the ROM table 37 or to the operating unit 38 the output value of the semiconductor can obtain as the entirely different value. In this case the model can be exchanged without an additional cost for development.

Figure 5:
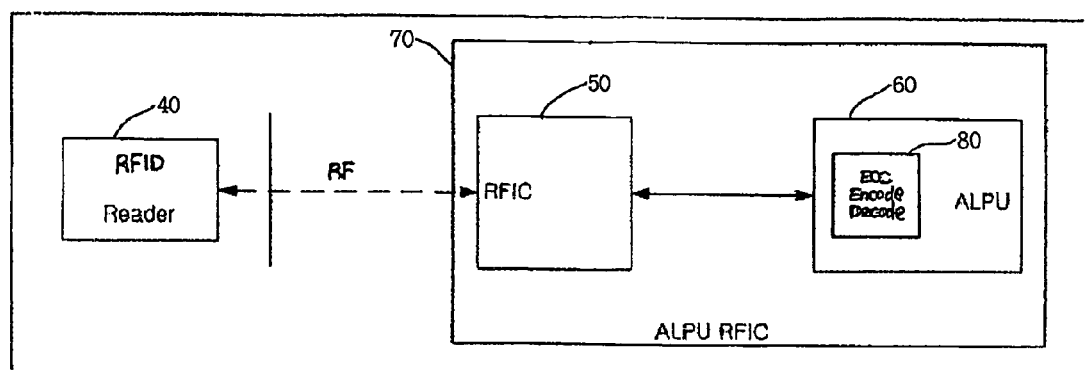
FIG. 5 is a block diagram of an exchanging system of inner information of a ALPU according to a third embodiment of the present invention.
Figure 6:
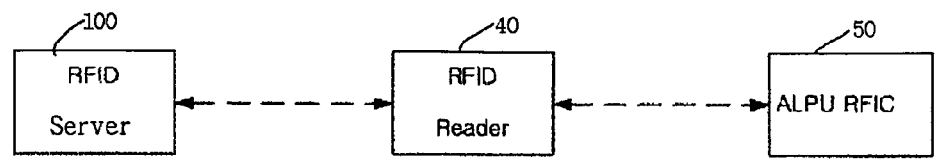
FIG. 6 is a block diagram of a ALPU and a RF Reader according to a third embodiment of the present invention.

FIG. 5 is a block diagram of a changing system of inner information of a ALPU according to a third embodiment of the present invention, FIG. 6 is a block diagram of a ALPU and a RF Reader according to a third embodiment of the present invention.

The device of the present invention according to the third embodiment comprises ALPU RF IC 70 for outputting the radio signal, RFID Reader 40 for reading the radio signal from the ALPU RF IC 70, RFID server 100 for determining whether the originally established signal is present or not according the radio signal read by the RFID Reader 40.

As shown in FIG. 6 the RFID Reader 40 is connected to the RFID server 100 so that it reads or exchanges of the information of the ALPU RFIC 70.

The ALPU RF IC 70 comprises RFIC 50 for inputting/outputting from/to the RF Reader 40 and ALPU 60 for encoding and decoding the radio signal from the RFID Reader 40.

The radio signal from the RF IC 50 is inputted to the ALPU 60 and to the encoder through ECC (Error Correction Code) 80 for encoding. The output signal from the ALPU 60 decodes by the decoder and outputs to the RF IC 50 through ECC 80 so that RFID Reader 40 can read the outputted value from the RF IC 50.

The above device according to the third embodiment it is not necessary the battery because the RFID Reader 1 occurs microwave to produce the electric energy by the RFID semiconductor that acknowledged the microwave.

The RFID, RFIC and UFID can be widely used under an ubiquitous environment thereby to be widely used to the life of the human. Without exchanging the inner structure of the semiconductor it can be exchanged the operation, structure and the information of the semiconductor by connecting to the RFID Reader 1 by approaching the software to the outer device.

When the RFID Reader is connected to the server using the network it can be acknowledged whether the burglary occurs or not because the position can be acknowledged at the real time according to the user's adjustment. Therefore, it can be applied to the electric products, shoes, tire, automobile, clothes, visa card, toy, ceramic ware, curio, and cash card that not as the electric products so that it is possible to manage of the serial number, information exchange of the ID number of the product, exchange of the personnel recording, burglary and position acknowledgement, recall acknowledgement. Furthermore, when the ECC is applied to the present invention for correcting the error data producing during the transmitting and receiving the data, the precise level can be increased.

INDUSTRIAL AVAILABILITY

As mentioned above the present invention has advantages as the followings.

First, a developer can control the quantity of the product because it is impossible to operate the product not constructed the chip set for preventing copy.

For example, if the manufacturer does not pay the royalty promised with the developer or manufactures the exceeded products promised with the developer, the developer can not take an appropriate action to the manufacturer except for a lawsuit. If the manufacturers is a small business or a foreigner the domestic law can not be applied to them. Furthermore, the third party manufactures the same product due to the revealing of information the appropriate action can not be applied to them.

However, according to the present invention an electric product can be controlled in manufacturing quantity because a chip set for preventing copy stores in the electric product.

Second, a developing cost can be reduced because CPU has a ROM table stored an inner constant value for coding so that a coding operation can be exchanged without exchanging an entire mask.

Third, because the CPU stores several algorithms other algorithms can be applied when the present algorithm is revealed.

Fourth, because the most upper code determining unit and the exchangeable memory are constructed, the ROM table can be exchanged at the time of inputting the most upper code thereby to be exchanged the coding method using the software.

Fifth, the RFID, RFIC and UFID can be widely used under an ubiquitous environment thereby to be widely used to the life of the human. Without exchanging the inner structure of the semiconductor it can be exchanged the semiconductor operation, structure thereof and the information thereof by connecting to the RFID Reader 1 by approaching the software to the outer device.

Sixth, when the RFID Reader is connected to the server using the network it can be acknowledged whether the burglary occurs or not because the position can be acknowledged at the real time according to the user's adjustment. Therefore, it can be acknowledged at the real time according to the user's adjustment. Therefore, it can be applied to the electric products, shoes, tire, automobile, clothes, visa card, toy, ceramic ware, curio, and cash card that not as the electric products so that it is possible to manage of the serial number, information exchange of the ID number of the product, exchange of the personnel recording, burglary and position acknowledgement, recall acknowledgement. Furthermore, when the ECC is applied to the present invention for correcting the error data producing during the transmitting and receiving the data, the precise level can be increased.

The invention claimed is:

1. A coding operating system of ALPU device comprising:

an interface for inputting/outputting a data signal from/to an outer device;

a code determining unit for determining the code according to a signal applied to an outer pin when the most upper code is inputted from the interface;

a ROM table for selecting the most upper code according to the outer pin signal;

a reprogrammable non-volatile memory for exchanging the ROM value according to the determining result of the most upper code determining unit;

an operating unit for inputting the data from the reprogrammable non-volatile memory and the data from the ROM table and the random data from the interface for operating the coding; and a register for outputting the operated value to the interface for outputting the operated value to the outer device.

2. A coding operating device comprises:

an ALPU RF IC for outputting a radio signal;

an RFID Reader for reading the radio signal from the ALPU RF IC; and an RFID server for determining whether an originally established coding signal is present or not according the radio signal read by the RFID Reader.

3. The device according to the claim 2, wherein said ALPU RF IC comprises an RFIC for inputting/outputting from/to the RF Reader; and an ALPU for encoding and decoding the radio signal from the RFID Reader.

4. The device according to the claim 3, wherein said ALPU comprises an ECC (Error Correction Code) unit for encoding and decoding and correcting the error data during the input/output between the RFID Reader and RFID and RF IC and ALPU.

5. A coding operating method comprising:

receiving a radio signal from an RFID reader at an RF IC;

applying a coded signal received by said RF IC to an ALPU through an ECC unit;

receiving an output signal of said ALPU from said ECC unit and applying it to said RF IC; and transmitting said output signal from said RF IC to said RFID reader.

* * * * *